Feb. 10, 1942.    J. B. BORGADT    2,272,633
ELECTRIC TUBE WELDING APPARATUS
Filed Sept. 2, 1939    6 Sheets-Sheet 1

Fig.1

INVENTOR.
JOHN B BORGADT
BY John H. Leonard,
ATTORNEY.

Feb. 10, 1942.   J. B. BORGADT   2,272,633
ELECTRIC TUBE WELDING APPARATUS
Filed Sept. 2, 1939   6 Sheets-Sheet 4

Fig. 4

INVENTOR.
JOHN B. BORGADT
BY
ATTORNEY.

Feb. 10, 1942. J. B. BORGADT 2,272,633
ELECTRIC TUBE WELDING APPARATUS
Filed Sept. 2, 1939 6 Sheets-Sheet 6

INVENTOR.
JOHN B. BORGADT
BY
John H. Leonard
ATTORNEY.

Patented Feb. 10, 1942

2,272,633

UNITED STATES PATENT OFFICE 2,272,633

ELECTRIC TUBE WELDING APPARATUS

John B. Borgadt, East Cleveland, Ohio

Application September 2, 1939, Serial No. 293,265

19 Claims. (Cl. 219—6)

This invention relates to an electric tube welding apparatus and particularly to a progressive electrical resistance tube welding apparatus for welding tubular metal stock of the commercial gauges and materials such as iron, steel, brass, copper, nickel and alloys thereof and Monel metal.

One of the principal objects of the present invention is to provide a simple and efficient apparatus for applying welding current efficiently to the tubular stock to be welded while at the same time eliminating or greatly reducing sparking and appreciable heating of the stock and current applying contactors in undesirable places.

An equally important object is to provide an apparatus whereby the seam cleft is maintained accurately in a predetermined longitudinal path of travel so as to be properly and accurately engaged by the contactors both during initial application of welding current thereto and closure of the seam cleft.

Another object is to provide an apparatus capable of producing a true and accurately controlled butt weld throughout a wide range of stock and kinds of material.

Other objects are to close the seam cleft firmly, to maintain the contactors in firm contact with the tube walls and introduce a current of exactly the strength and duration required for the particular heating effect, to close the seam cleft at the exact predetermined rate and extent preparatory to shutting off the current, and to continue the closure of the seam cleft at the proper moment after the current is shut off, and to hold the seam cleft in closed condition firmly until the metal has cooled sufficiently to eliminate breaks and dislocation of the heated portion.

Other objects are to provide a large area of contact between the stock and contactors, to operate the contactors in accurate predetermined relation to the feed of the stock, to reduce very materially the comparatively large losses heretofore resulting from long transformer leads and large masses of metal with their accompanying increase in eddy current losses.

Other and more specific objects are to provide contactors having contact faces which travel inwardly with the stock as the seam cleft is closed while maintaining firm contact with the stock over the entire contact area, to upset the seam cleft uniformly along the entire length of contact and without deformation of the tubular stock, and to constrain the heating effects produced by the current introduced by the contactors to a zone which is more nearly entirely localized in the seam and within the end limits of the contactors.

Other objects and advantages will become apparent from the following specification wherein reference is made to the drawings, in which.

Referring to the drawings, a preferred embodiment of the present invention is shown for purposes of illustration and includes a hollow base or support 1 on which is carried a rigid table 2 for supporting the operating mechanism. The table 2 is provided with a central well formed by a raised peripherally closed flange 3 so that coolant can be retained in confined relation to the other mechanism of the table.

Carried on the table are upright posts 4 on the upper end of which is mounted a transformer 5 capable of supplying a low voltage, high amperage welding current through its secondary 6. The particular transformer used may be one of several types which are suitable for the purpose, preferably that disclosed in U. S.

Letters Patent No. 1,832,835, issued to me on November 17, 1931.

Carried by the table 2 are longitudinally extending parallel guides 7, the guides 7 being arranged in pairs, one pair in advance and one beyond the zone of welding.

*Stock feeding mechanism and adjustment*

Figure 1:
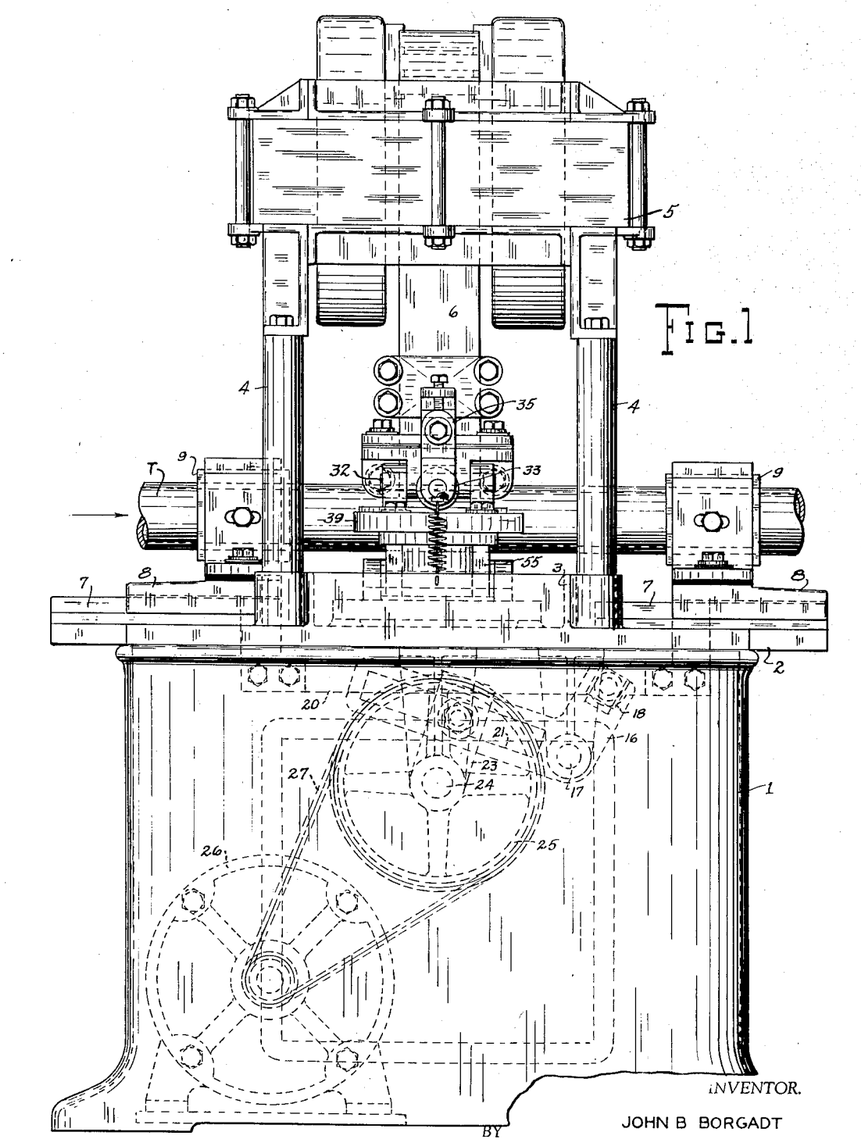
Fig. 1 is a front elevation of a preferred embodiment of the present apparatus.
Figure 2:
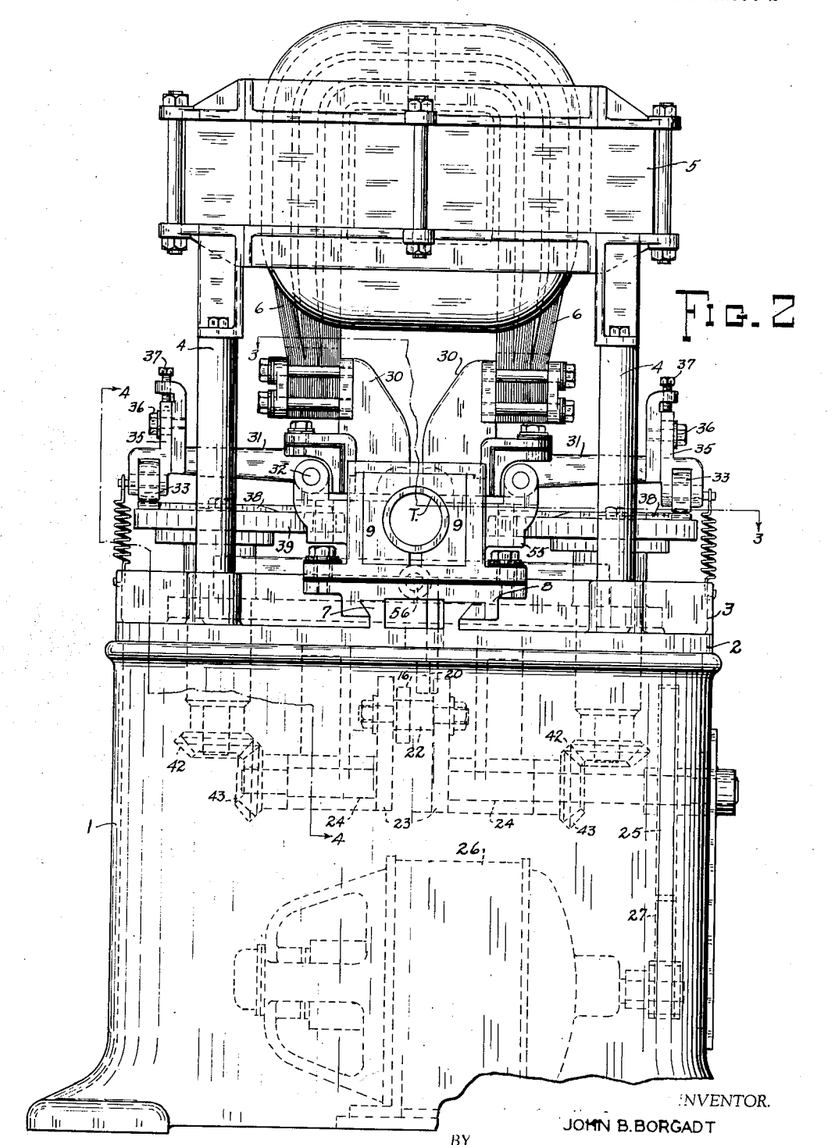
Fig. 2 is an end elevation of the apparatus illustrated in Fig. 1.

Slidably mounted on the guides 7 and guided thereby are feed carriages 8 which are identical in form and function, and, in the form illustrated, operate concurrently in the feeding and return direction. The upper portion of each carriage 8 is insulated from the lower portion and is in the form of a bracket for carrying grippers 9. Mounted in the bracket portions of each of the carriages 8 are complementary grippers 9 and seam guides 109 which are arranged to operate for gripping the tubular stock T and feeding and guiding the same when the carriages 8 are moved in one direction, and to release the stock when the carriages 8 are moved in the opposite direction. In the form illustrated, the grippers 9 operate to grip the stock when the carriages 8 are moved to the right in Fig. 1, and to release the stock when moved in the opposite direction so that the stock is propelled from left to right.

The guide 109 is provided on the carrier 8 which is in advance of the welding throat. This guide extends into the open seam cleft so as to constrain the stock from rotation about its axis while the grippers 9 are in released condition relative to the stock.

Figure 3:
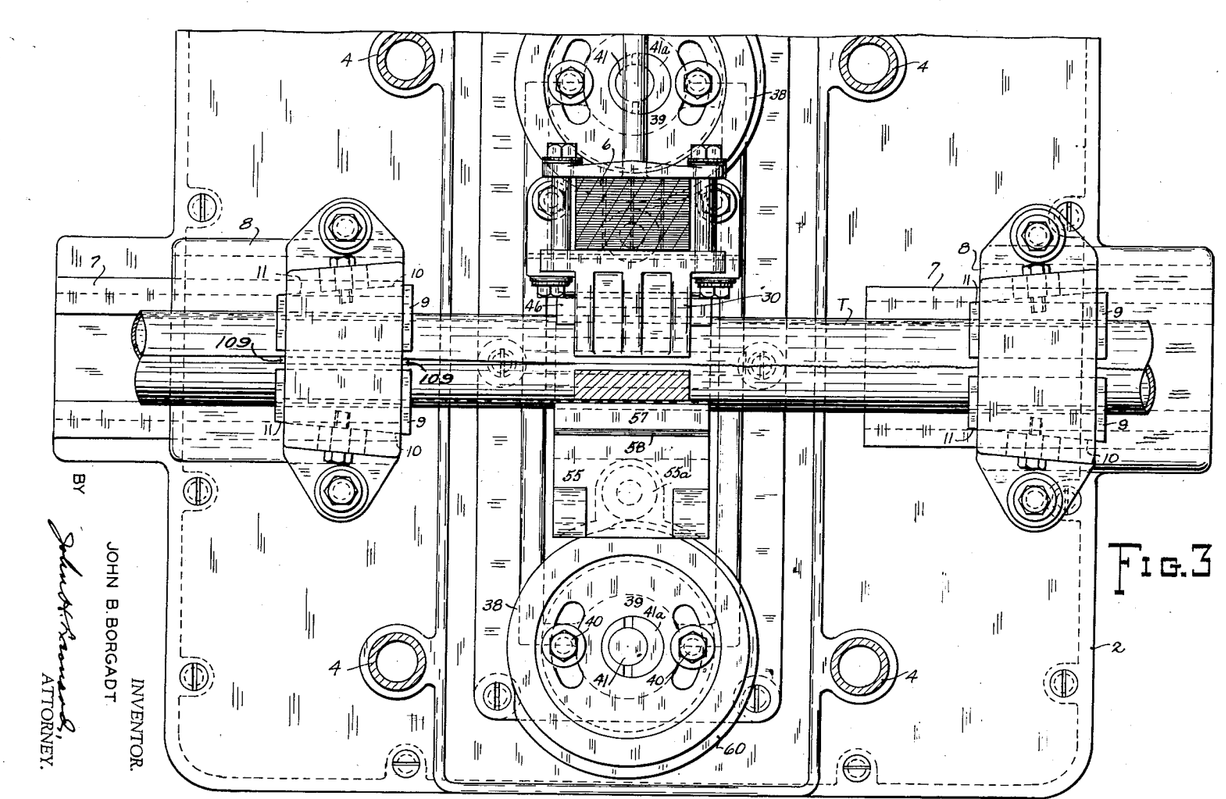
Fig. 3 is an enlarged plan view of the apparatus illustrated in Figs. 1 and 2, part thereof being shown in section taken along the line 3—3 in Fig. 2.
Figure 6:
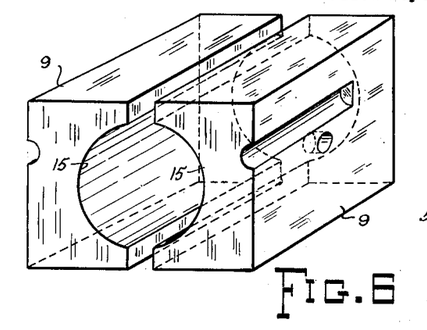
Fig. 6 is a perspective view of the feeding jaws used in connection with the present apparatus.

As better illustrated in Figs. 3 and 6, the carriages 8 have oppositely positioned walls 10 which are divergent in the direction of feed of the stock. The grippers 9 have walls 11 complementary to the walls 10. Suitable springs 13 are operatively interposed between the grippers 9 and the carriages 8, preferably in meshing grooves in the carriages and grippers. These springs normally are operative to urge the grippers in a direction relative to the associated carriages to effect a light gripping action between the grippers and the stock so that immediately upon movement of the carriages in the stock feeding direction, the grippers are effective for feeding the stock. Furthermore, the seam guide and the grippers, when feeding the stock, constrain it from rotation about its own axis and thus prevent the seam cleft from moving laterally from the welding zone out of the desired position. In the form illustrated, the grippers are provided with suitable bolts 14 operating in elongated slots in the carriages, as better illustrated in Fig. 4, so as to constrain the grippers from movement out of their associated carriages. This arrangement also permits the ready insertion of other grippers adapted to feed a different size tubing when it is desired to change the diameter of the tubing to be welded. The gripping faces 15 of the grippers 9 preferably are of the same radius as the portion of the stock to be engaged thereby. Thus, by reciprocating the carriages 8 longitudinally of the path of travel of the stock, the stock is fed intermittently from left to right in the form illustrated.

In order to reciprocate the carriages 8, a rocker 16 is pivotally mounted on a rock shaft 17 in the frame of the machine, and one end of the rocker 16 carries a radially slidable block 18 which is pivotally connected by a suitable bolt 19 to a tie bar 20 which in turn is rigidly connected to both of the carriages 8. The other arm of the rocker is provided with a guideway 21 in which a suitable crank pin 22 is arranged for sliding or rolling movement longitudinally of the guideway 21. The ends of the crank pin 22 are secured to the crank arms 23 of a crank shaft 24, one end of which carries a main driving sprocket 25 which is driven by a suitable motor 26 through a chain 27. Instead, if desired, the usual double end shaft motor may be used and the end shafts connected by chains and sprockets to the ends of the crank shaft 24, respectively, so as to positively drive the crank shaft from both of its ends. Thus, upon rotation of the crank, the rocker arm 16 is caused to rock about the pivot 17 for driving the carriages 8 with a reciprocatory motion. The crank pin 22 is preferably mounted in slots in the crank arms 23 so that it can be adjusted radially of the crank shaft 24 for adjusting the reciprocatory motion and speed of the carriages 8. Suitable set screws 28 or other means may be provided for securing the crank pin 22 in the desired adjusted position. Thus, the stock can be fed intermittently at the speed desired, and by proper timing, rapid movement in the direction of feed and slower movement in the return direction of the grippers 9, during which heating occurs, can be obtained and the stock constrained from twisting about its own axis by means of the seam guide during the feeding operation. Furthermore, due to the effective gripping of the grippers 9, an accurately timed relation and exact and accurate predetermined amount of advancement of the stock, as desired, is obtainable.

*Contactors and operating mechanism*

Referring next to the contactors and the mechanism by which they are applied to the tubular stock, this mechanism is best illustrated in Figs. 2, 3, 4 and 5. The termini of the secondary 6 of the transformer are connected to suitable contactor carriers 30, respectively, the connection between the secondary and the contactor carriers 30 preferably being such as described in my copending application Serial No. 293,267, filed September 2, 1939, so as to reduce hysterisis and other current losses. As better illustrated in Fig. 5, the contactor carriers 30 are mounted on ends of suitable rocker arms 31 and electrically insulated from their respective rocker arms, as indicated at 31a. The rocker arms 31 are mounted for rocking movement on pivots 32 which are carried by the closure and upsetting jaws in a manner later to be described.

Beyond the pivots 32 from the carriers 30, cam rollers 33 are adjustably mounted on the ends of the rockers 31. In the form illustrated, this adjustable connection is effected by means of suitable guideways 34 on the rocker arms 31 and guide block portions 35 which carry the rollers 33 and are adjustable along the guideways. The guide blocks 35 are held securely in adjustable position by clamping bolts 36 and adjusting screws 37. In this manner, the carriages 30 are arranged to rock downwardly toward the tubular stock T, the termini of the secondary 6 of the transformer being sufficiently resilient to permit this rocking action. The rocker arms 31 are rocked to disposed the contactors into firm engagement with the stock and to hold them in such engagement while the feeding means is idle and to remove them from contact with the stock during the feeding operation. For effecting this operation in accurately timed relation to the feed of the stock, the rocker arms 31 are operated through the medium of the cam rollers 33 by suitable rotatable cams 38. As better illustrated in Fig. 3, the cams 38 are mounted on suitable rotatable plates 39 and are adjustable circumferentially on the plates 39. The cams are secured in adjusted position on the plate 39 by means of suitable clamping bolts 40 extending through elongated circumferential slots in the cam 38 and in threaded engagement with the plate 39. The plate 39 is rotatably driven by means of an upright shaft 41, on the lower end of which is a beveled gear 42 in driven relation to a cooperating beveled gear 43 on the crank shaft 24. Thus, the shaft 41 is driven in predetermined timed or synchronous relation to the crank shaft 24 and thereby the contactor carriers 30 are operated in an accurate timed relation to the rate of feed. For different sizes of tubular stock it is sometimes desirable to provide for adjustment of the cam 38 laterally of the path of travel. In order to provide for this adjustment, the shaft 41 is mounted in an eccentric bushing 41a and the beveled gear 43 may be mounted for adjustment longitudinally of the shaft 24, or fixed. With the gear 43 fixed and therefore not adjustable, all adjustments laterally are through the bushing 41a. Thus, the shaft 41 may be displaced laterally of the path of travel of the tubing without changing the operating characteristics of the cam 38.

Figure 8:
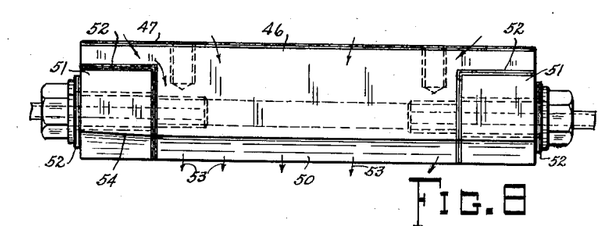
Fig. 8 is an enlarged front elevation of one of the contactors and associated parts forming a part of the present apparatus.
Figure 9:
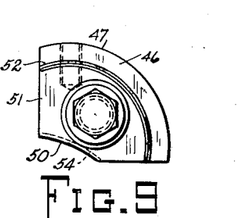
Fig. 9 is an end elevation of the apparatus illustrated in Fig. 8.

Referring next to the contactors and their relation to the carriers 30, each of the carriers 30 is provided with an arcuate contact surface 45 against which the contactors 46 are mounted for sliding circumferential movement. As better illustrated in Fig. 8, each of the contactors 46 has an arcuate surface 47 complementary to the surface 45 of the carriers and is tapped to receive a bolt 48 which operates in a slot 49 in the carriers so as to hold the contact surfaces 45 and 47 into firm circumferentially sliding contact with each other and thus permit inward travel of the stock contacting faces of the contactors as the seam cleft is closed. The surfaces 45 and 47 preferably are silver plated so as to reduce oxidation and current losses to a minimum. Each of the contactors 46 has an arcuate contact face 50 which conforms in radius substantially to the radius of the tubular stock for the major portion of its length in a direction parallel to the axis of the tubular stock. The two contactors are preferably of the same length and may be so positioned that when they are in engagement with the stock, they are staggered lengthwise of the stock, that is, one of them is slightly ahead of the other in a direction along the path of travel of the stock, as best illustrated in Fig. 3. As a result, when they are applied to the work piece, there is not so sharp a line of demarcation between the end of the weld resulting from one application of the contactors and the trailing end of the next succeeding weld. Due to the stagger of the contactors along the path there is no direct line across the path at which there is no heat dissipating or cooling means and, consequently, overheating of the stock at the ends of the contactors with resultant overwelding is eliminated. Whether or not this staggered relationship is used depends entirely on the type of material and wall thickness, and also on the accuracy of feeding. The staggered relation is desirable when a more gradual blend of one weld into another is to be obtained. For a sharply defined weld, the contactors may be placed directly opposite each other.

In order to confine the heating effects on the stock within the longitudinal or endwise limits of the contactors 46 as nearly as possible, and in order to assure substantially uniform application along the entire contact face 50, the contact face 50 is made shorter than the face 47, this shortening occurring by removal of metal at both ends of the contactor partway of its depth.

At the undercut ends of the contactor are copper heat dissipating blocks 51 which extend from the end limits of the face 50 outwardly to the outer end limits of the face 47. These blocks are electrically insulated from the contactor 46 by means of very thin layers of insulating material, such as indicated at 52. The spacing of the blocks 51 from the end limits of the contact face 50 is as small as possible and preferably does not exceed 1/64". These copper blocks, being of high heat conductivity, carry away heat from the ends of the weld and thus localize the weld as nearly as possible between the end limits of the face 50. At the same time, since they are insulated from the contactor 46, they perform no direct electrical function but do cause the current entering the face 47 to flow around the blocks 51 and thus take a direct path transversely of the seam cleft and entirely to the ends of the face 50, as indicated by the arrows 53. By virtue of the undercutting of the contactors and the provision of the blocks 51, substantially the same intensity of current is provided at the ends of the face 50 as at any other portion, and the excessive heating effect which might occur to a preceding weld when the contactors are applied for a succeeding weld is eliminated or greatly reduced. Likewise, the blocks 51 prevent any deformation of the tube adjacent to the weld. In order to confine the current so as to prevent it from traveling around the tube, the invention described in United States Letters Patent No. 1,651,438, issued December 6, 1937, may be employed in addition to the structure herein described.

At the leading end of the contactors 46, the blocks 51 are preferably flared in a direction opposite from the direction of travel, as indicated at 54, so as to compensate for the difference in diameter of the portion of the tube which is upset and the succeeding portion which is not yet upset.

Referring next to the closure means for effecting closure of the seam cleft and upsetting of the weld, this mechanism comprises companion closure carriages 55 which are symmetrical and oppositely arranged and pivotally connected by a pivot 56 for swinging upwardly and inwardly into contact with the tubular stock and in the proper direction for effecting closure of the cleft and upsetting of the weld. The carriages 55 carry removable closure jaws 57, respectively, which are insulated from the carriages 55 by suitable insulation, as indicated at 58.

Figure 7:
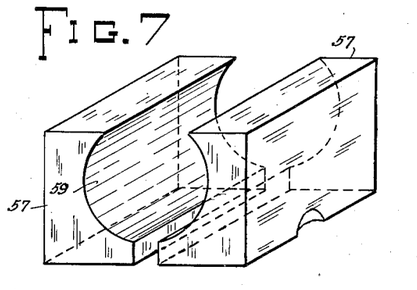
Fig. 7 is a perspective view of a pair of upsetting jaws used in connection with the present invention.

The specific construction of the closure jaws 57 is better illustrated in Fig. 7, wherein the stock contacting faces 59 thereof are arcuate and of the same diameter as the finished tubing after the upsetting operation. It should be noted that since the jaws 57 are readily removable, different size jaws 57, as well as welding contactors 45, may be readily provided for the particular size of tube to be welded. Likewise, the proper length for effecting the desired electrical current and pressure application for the particular material can readily be obtained. For example, when welding heavy stock on a comparatively small machine, it is desirable to decrease the length of the portion to be welded so as to reduce the amount of stock to be heated in a given cycle of operation and thus reduce the current required for heating and the power required for upsetting in a given time interval.

In addition to being pivotally mounted on the pivot 56, the carriers 55 likewise are pivotally connected to the rocker 31 of the contactor carriers through the medium of the pivots 32 heretofore described, and thus provide a floating fulcrum for the rocker arms 31.

Each of the carriers 55 is provided with a cam roller, such as indicated at 55a which is in operative engagement with a cam 60 formed on the peripheral surface of the same member on which the cam 38 is formed. Thus, the cams 38 and 60 are in fixed relation with respect to each other so that the upsetting and application of the contactors is in a fixed relation. If desired, however, the cam 38 may be made adjustable relative to the cam 60 so as to change this relation. Thus, upon driving of the crank shaft 24, the stock is first fed and then released by the grippers 9, and as they return toward their starting position, the cams 38 and 60 become operative first to rock the contactors into firm engagement with the stock, and, while they are in engagement, to rock the upsetting jaws 57 upwardly for closing the seam and upsetting the weld. The contactors are carried bodily inwardly with the jaws 57 due to the pivotal connection 32 and also are held in firm downward contact with the tubular stock. At the same time, the contactors 46 travel inwardly with the stock and compensate for differences in diameter by swinging about the surface 45 of the carriers. Thus, the tubular stock is firmly clamped between the jaws and carriers for applying the current thereto and for effecting the desired upset of the weld.

Figure 4:
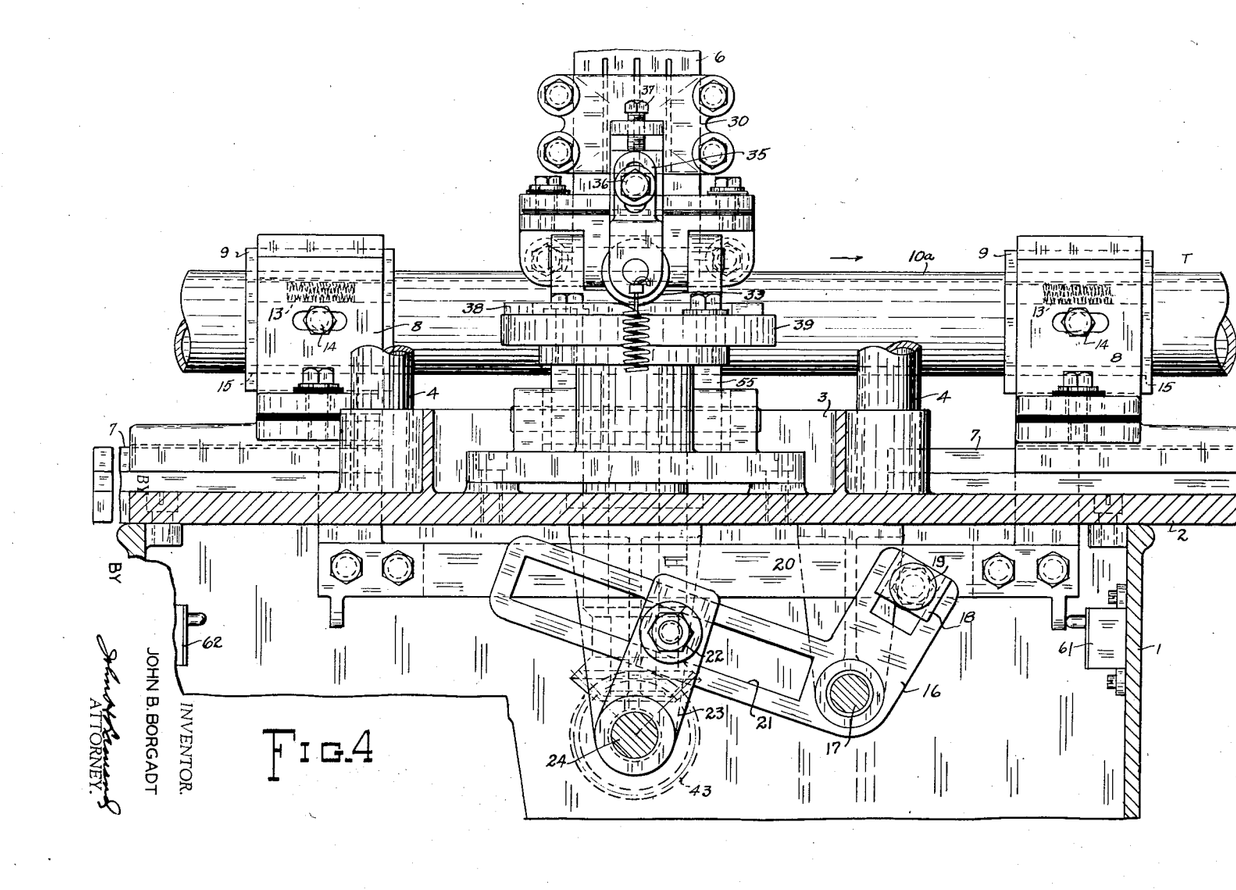
Fig. 4 is an enlarged fragmentary front elevation of the apparatus illustrated in Figs. 1 and 2, part thereof being shown in section along the line 4—4 in Fig. 2.
Figure 5:
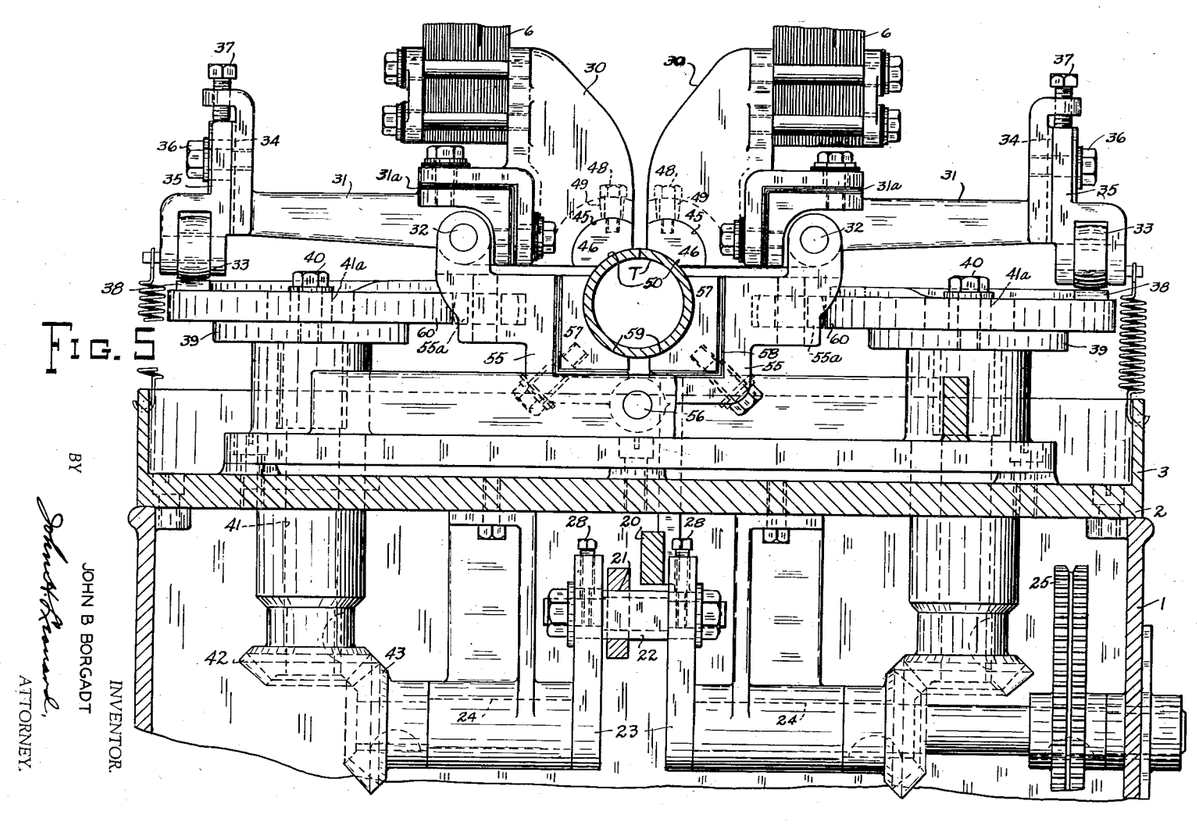
Fig. 5 is an enlarged end elevation of the apparatus illustrated in Figs. 1 to 4, part thereof being shown in section for clearness in illustration.

Referring next to Fig. 4 suitable means are provided for accurately controlling the making and breaking of the welding circuit. In the form illustrated, this is accomplished by a normally open on-timing switch 61 and a normally closed off-timing switch 62. These switches are preferably mounted in a position to be engaged by suitable abutments on the tie rod 20, the switch at the right in Fig. 4 being engaged and operated temporarily for operating a control circuit which is closed thereby at the completion of movement of the carriers 8 in the stock feeding direction and remains closed during return of the carriers. The switch 62 correspondingly is arranged to operate the control circuit so that the latter is broken when the carriages 8 have completed their return stroke and are ready to initiate feeding of the stock. However, other means for making and breaking the welding circuit may be employed.

Figure 10:
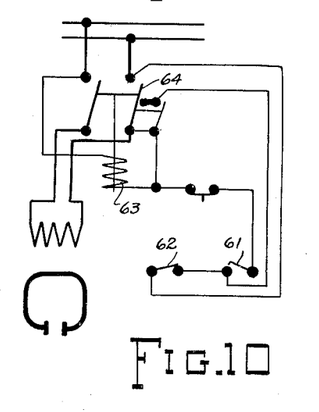
Fig. 10 is a wiring diagram showing a circuit that may be used with the present apparatus.
Figure 11:
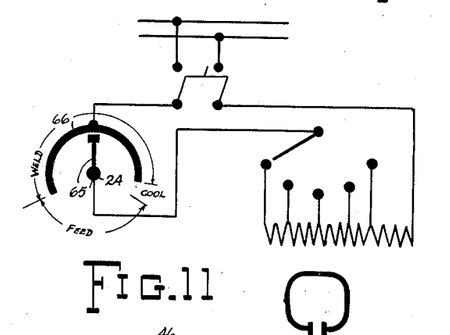
Fig. 11 is a modified wiring diagram.
Figure 12:
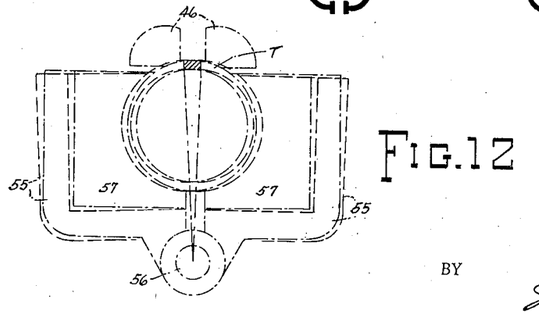
Fig. 12 is a diagrammatic end elevation showing the movement of the upsetting jaws of the present invention.

Two electric circuits suitable for use in connection with the present invention are illustrated in Figs. 10 and 11, respectively, that in Fig. 10 employing switches 61 and 62, heretofore described. These switches, in turn, operate a control circuit to a solenoid 63 which operates a main switch 64 for completing the circuit from the secondary of the transformer through the electrodes. In Fig. 11, a rotary type of switch, which may be driven in direct relation to the crank shaft 24, is employed. In this form, the movable contactor 65 rotates with the crank shaft 24 or other rotating part of the mechanism. A stationary ring contact 66 is provided for cooperation with the contact 65. The ring contact 66 is of a length corresponding to the desired welding period and comprises substantially two-thirds of a complete revolution of the contact 65. While the contacts 65 and 66 are in contact with each other, welding current is supplied, this period of contact being noted in Fig. 11 as the on-timing. Upon continued rotation of the contactor 65, a short off-time period occurs between the cessation of on-time and the beginning of the feeding period, which permits cooling of the newly welded seam. From the termination of the off-time until the beginning of the on-time is a period in which the electrical circuit is inoperative and the feeding of the stock occurs. It should be noted, however, that the closure of the cleft and upsetting occurs during the so-called "on-time" period. Thus, the stock is intermittently fed, and between the intervals of feeding, it is heated, welded, upset and cooled, ready for subsequent removal of the burr, which may be accomplished by means of a suitable broaching tool, such as described in my United States Letters Patent No. 2,187,485, issued January 16, 1940.

With certain materials it is desirable first to weld the material and immediately after anneal the weld by sending a current either of full strength or less through the weld, or, first to preheat the stock and after that make the weld. This can be done with a switch and mechanism such as described by breaking and closing the current at predetermined points in relation to the upset, the proper relation being obtained by selecting proper contact segments for the switch and proper adjustment of cams for the upset jaws.

I claim:

1. In a welding apparatus, means for feeding tubular stock lineally, intermittently, contactors for applying welding current to the stock, means for moving the contactors individually toward and into contact with respective portions of the stock at opposite sides of the seam cleft during the periods between successive feeding operations, a pair of upsetting jaws engageable with the stock at opposite sides of the seam cleft for closing the seam and upsetting the weld during the latter part of said periods, said jaws being mounted for movement into and out of engagement with the stock about a common axis parallel to the axis of the stock, and means operative for connecting the contactors to a source of welding current.

2. In a welding apparatus for welding tubular stock, means for feeding the stock intermittently lineally, a pair of contactors engageable with the stock at opposite sides of the seam cleft for supplying current thereto, upsetting jaws engageable with the stock at opposite sides of the seam cleft for upsetting the weld, each contactor and its associated jaw being connected together for operation by common operating lever, means to effect operation of the common actuating levers during the period while the feeding means is inoperative to feed the stock, means operative to connect the contactors to a source of welding current.

3. In a welding apparatus for welding tubular stock, means for feeding the stock intermittently, contactors for applying current to the stock, switch means for connecting the contactors to a source of current after each feeding operation for a heating period and to break the connection for a period after heating and before initiation of the succeeding feeding operation for permitting the stock to cool, and means engageable with the stock, longitudinally of the stock, at the same location as the contactors and in spaced relation to the contact position of the contactors circumferentially of the stock to upset the stock during the heating period and to hold it in upset condition during the period of cooling.

4. In a welding apparatus, means for feeding tubular stock lineally, intermittently, contactors engageable with the stock, said contactors extending generally lengthwise of the path of travel, upsetting means engageable with the stock and substantially coextensive lengthwise of the path of travel with the contact faces of the contactors, means for effecting operative engagement of the contactors and upsetting means with the stock between the periods in which the stock is being fed, and means carried by the contactors and rigid therewith for confining the heating effects substantially within the end limits of said contact faces.

5. In an apparatus for welding tubular stock, means for feeding the stock, contactors arranged at opposite sides of the seam cleft and movable relatively toward each other for engaging the stock, and having contact faces extending longitudinally of the stock, heat dissipating means closely adjacent at least one end of each contact face and rigid therewith and engageable with the stock concurrently with the contact faces for confining the heating effect more accurately within the contact zone.

6. In an apparatus for welding tubular stock, closure means for closing the seam cleft, contactors comprising carriers of conducting material and contact shoes carried thereby, respectively, said carriers being supported for movement relatively toward and away from each other and operable for applying the shoes to the stock and holding the shoes in pressure contact with the stock, means for operating the carriers, means for connecting the carriers to a source of welding current, said carriers and their associated shoes having arcuate, relatively sliding contact surfaces with axes generally parallel to the path of the stock for permitting the shoes to turn about said surfaces and remain in full contact with the stock as the cleft is closed, the arcuate faces on the carriers being concave toward the axis of the stock, and means connecting the shoes to the carriers while permitting the shoes to effect said movement relative to the carriers.

7. In a tubular stock welding apparatus, means for feeding tubular stock lineally, upsetting jaws at opposite sides of the path of the stock, pivot means offset from and extending lengthwise of the path of stock travel and supporting the jaws for swinging movement relatively toward and away from each other, means for moving said jaws toward each other for upsetting the weld, contactors arranged at opposite sides of the path and pivotally mounted on said jaws, respectively, by pivots extending lengthwise of said path, and said contactors being operable to swing into and out of contact with the stock, and means for effecting predetermined contact of the contactors and jaws relative to the stock concurrently.

8. In an apparatus for welding tubular stock, stock feeding means for feeding the stock along a lineal path, contactor means, complementary upsetting jaws pivotally mounted for swinging about an axis which extends parallel to the path of the tubular stock and is offset therefrom on the side opposite from the seam cleft, said jaws being movable about said axis relatively toward and away from each other, contactors arranged adjacent to and at opposite sides of the seam cleft and pivotally mounted on said jaws, respectively, by pivots extending parallel to said path and operable to swing into and out of contact with the stock, and means for operating the contactors and jaws concurrently during a predetermined period so as to grip the tubular stock firmly, and to hold the tubular stock, during heating and upsetting operations, between the jaws and contactors concurrently.

9. In an apparatus for welding tubular stock, stock feeding means for feeding the stock along a lineal path, contactor means, complementary upsetting jaws pivotally mounted for swinging about an axis which extends parallel to the path of the tubular stock and is offset therefrom on the side opposite from the seam cleft, said jaws being movable about said axis relatively toward and away from each other, contactors arranged adjacent to and at opposite sides of the seam cleft and pivotally mounted on said jaws, respectively, by pivots extending parallel to said path and operable to swing into and out of contact with the stock, a continuously driven member, cams thereon, cam operated means on each jaw and its associated contactor for operating the jaws and contactors, cams on the driven member for driving the cam operated means, respectively, and means for adjusting the positions of said cams relative to each other to adjust the stock contacting relation of the operations of the jaws and contactors with respect to each other.

10. An apparaus for welding tubular stock and comprising a reciprocating gripper and guide means operative to grip the stock and constrain it from rotation and move it along said path when the gripper and guide means are moved in one direction, and to release the stock when the gripper and guide means are moved in the opposite direction, welding contactors arranged for connection to a source of welding current, and operable to move into and out of engagement with the stock, means operatively interconnecting the gripper and guide means and contactors for effecting engagement of the contactors with the stock only while the gripper and guide means are inoperative to feed the stock, and means for upsetting the stock for effecting the weld.

11. An apparatus for feeding tubular stock and comprising a reciprocating gripper for feeding the stock, means for guiding the gripper for reciprocatory motion along the path of travel of the stock, a rocker arm for reciprocating the gripper, a crank operatively connected to the arm for oscillating the arm, a crank shaft for driving the crank, contactors for applying welding current to the stock, carrier means for supporting and moving the contactors into and out of welding contact with the stock, stock upsetting means for closing the seam, and driving connections between the crank shaft and both of said means for applying the contactors and the upsetting means to the stock only while the gripper is inoperative to feed the stock.

12. In a welding apparatus, means for feeding tubular stock lineally, means for closing the seam cleft and upsetting the weld, a pair of contactors at opposite sides of the seam cleft, means supporting the contactors for movement relatively toward each other and into firm stock contacting relation with the stock, said contactors having contact faces substantially congruent with the stock, said faces being flared toward their leading ends to compensate for the difference in diameter between portions of the stock adjacent the weld and portions of the stock farther from the weld, and means for moving the contactors into and out of contact with the stock.

13. In an apparatus for welding tubular stock, complementary contactors pivotally supported at opposite sides of the seam cleft of the stock and operable for swinging into and out of contact with the stock about respective axes extending parallel to the path of the stock and on the side of the tubular stock at which the seam cleft is located, means for connecting the contactors to a source of welding current, upsetting means pivotally supported at the opposite side of the tubular stock from the seam cleft and approximately in the plane thereof, and means for swinging the contactors about their axes and into contact with the stock in timed relation to the operation of the upsetting means.

14. In a welding apparatus, means for feeding tubular stock lineally, means for closing the seam cleft and upsetting the weld, a pair of contactors at opposite sides of the seam cleft, means supporting the contactors for movement relatively toward each other and into firm contact relation with the stock, said contactors being opposite to each other for substantially their entire length and terminating at their ends in slightly offset relation to each other longitudinally of the path of stock travel, and means for moving the contactors into and out of contact with the stock.

15. In an apparatus for welding tubular stock, means for feeding the stock lineally, contactors adapted for connection to a source of welding current and arranged at opposite sides of the seam cleft of the stock, said contactors being movable relatively toward each other for engaging the stock, and having contact faces extending longitudinally of the path of travel of the stock, a cooling block on at least one end of each contactor and rigid therewith, each block having a contact face forming a continuation of the contact face of its associated contactor and engageable with the stock concurrently with the contact face of its associated contactor, and means electrically insulating said blocks from the associated contactors.

16. In an apparatus for welding tubular stock, means to feed the stock lineally, closure means for closing the seam cleft, contactor carriers of conducting material, contactors carried thereby, respectively, said carriers being supported for movement relatively toward and away from each other and operable for applying the contactors to the stock, means for operating the carriers, means for connecting the carriers to a source of welding current, said carriers and their associated contactors having arcuate, relatively sliding contact surfaces with axes generally parallel to the path of the stock for permitting the contactors to turn about said surfaces and remain in full contact with the stock as the seam cleft is closed, means connecting the contactors to the carriers while permitting the shoes to effect said movement relative to the carriers, the arcuate faces on the carriers being concave toward the axis of the stock, and said sliding contact surfaces between the contactors and associated carriers being of greater area than the stock contacting faces of the contactors.

17. In an apparatus for welding tubular stock, means for feeding the stock lineally, contactors adapted for connection to a source of welding current and arranged at opposite sides of the seam cleft of the stock, said contactors being movable toward and away from each other for engaging the stock and having contact faces extending longitudinally of the path of travel of the stock, carriers for said contactors respectively, means for connecting the carriers to a source of welding current, said carriers and their associated contactors having complementary, arcuate, relatively sliding contact surfaces with axes generally parallel to the length of the stock, said arcuate faces on the carriers being concave toward the axis of the stock, the arcuate face of each contactor being longer than the stock contacting face thereof, a block on at least one end of each contactor and underlying the arcuate face thereof and insulated electrically from the contactor, each block having a stock contacting face forming a continuation of the stock contacting face of its associated contactor, whereby current entering the arcuate face of the contactor is distributed fully to the ends of the stock contacting face of the contactor, and means connecting the contactors to the carriers while permitting the contactors to effect movement relative to the carriers.

18. An apparatus for welding tubular stock and comprising a reciprocating gripper operative to grip the stock and move it along a predetermined path of travel in one direction and to release the stock when the gripper is moved in the opposite direction, welding contactors arranged for connection to a source of welding current and operable to be moved into and out of engagement with the stock, means operatively interconnecting the gripper and contactors for effecting engagement of the contactors with the stock only when the gripper is inoperative to feed the stock, and means movable with the gripper and extending into the seam cleft in the stock for constraining the stock from rotation about its axis while the grippers are released, and means for upsetting the stock for effecting the weld.

19. In a tubular stock welding apparatus, oppositely spaced upsetting jaws for engaging opposite sides of the stock, means pivotally supporting said jaws for movement into and out of engagement with the stock, contactors pivotally mounted on said jaws respectively with their pivotal axes extending parallel to the pivotal axes of the jaws and for swinging into and out of engagement with the stock, and means for effecting predetermined contact of the contactors and jaws relative to the stock concurrently by swinging the jaws and contactors about their respective pivotal axes concurrently.

JOHN B. BORGADT.